United States Patent
Svensson et al.

(10) Patent No.: US 11,452,953 B2
(45) Date of Patent: Sep. 27, 2022

(54) ENGINE OIL SYSTEM AND A LID

(71) Applicant: VOLVO TRUCK CORPORATION, Gothenburg (SE)

(72) Inventors: Magnus Svensson, Gothenburg (SE); Roger Bodén, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 139 days.

(21) Appl. No.: 16/961,582

(22) PCT Filed: Jan. 16, 2018

(86) PCT No.: PCT/EP2018/051006
§ 371 (c)(1),
(2) Date: Jul. 10, 2020

(87) PCT Pub. No.: WO2019/141348
PCT Pub. Date: Jul. 25, 2019

(65) Prior Publication Data
US 2020/0368650 A1    Nov. 26, 2020

(51) Int. Cl.
*B01D 29/96* (2006.01)
*B01D 29/58* (2006.01)
(Continued)

(52) U.S. Cl.
CPC ............. *B01D 29/96* (2013.01); *B01D 29/58* (2013.01); *B01D 29/90* (2013.01); *B01D 35/06* (2013.01);
(Continued)

(58) Field of Classification Search
CPC ........ B01D 29/96; B01D 29/58; B01D 29/90; B01D 35/06; B01D 35/26;
(Continued)

(56) References Cited

U.S. PATENT DOCUMENTS

| 4,075,099 A | 2/1978 | Pelton et al. |
| 4,942,970 A | 7/1990 | Jay |

(Continued)

FOREIGN PATENT DOCUMENTS

| CN | 203525453 U | 4/2014 |
| CN | 105289120 A | 2/2016 |

(Continued)

OTHER PUBLICATIONS

China Office Action dated Oct. 22, 2021 in corresponding China Patent Application No. 201880086614.2, 10 pages.
(Continued)

*Primary Examiner* — Yi-Kai Wang
(74) *Attorney, Agent, or Firm* — Venable LLP; Jeffri A. Kaminski (57) ABSTRACT

The invention relates to an engine oil system (1, 1', 101) for supplying oil to oil using components (3) in a vehicle (800). The engine oil system comprises an oil pan (10) for holding oil received from the oil using components, an oil pump (20) fluidly connected to the oil pan for pumping oil from the oil pan to the oil using components, and an oil filter (30, 30' 130) configured for cleaning the oil. The oil filter has a filter inlet (32, 32', 132) for receiving oil to be cleaned, and a filter outlet (34, 34' 134) for discharging oil from the oil filter. The oil filter is arranged in the oil pan such that, in use, the filter outlet discharges oil into the oil pan.

23 Claims, 7 Drawing Sheets

(51) Int. Cl.
    *B01D 29/90*     (2006.01)
    *B01D 35/06*     (2006.01)
    *B01D 35/26*     (2006.01)
    *F01M 1/02*     (2006.01)
    *F01M 11/00*     (2006.01)
    *F01M 11/02*     (2006.01)
    *F01M 11/03*     (2006.01)

(52) U.S. Cl.
    CPC ............... *B01D 35/26* (2013.01); *F01M 1/02* (2013.01); *F01M 11/0004* (2013.01); *F01M 11/02* (2013.01); *F01M 11/03* (2013.01); *B01D 2201/188* (2013.01); *B01D 2201/282* (2013.01); *B01D 2201/287* (2013.01); *B01D 2201/306* (2013.01); *B01D 2201/4038* (2013.01); *F01M 2011/0029* (2013.01); *F01M 2011/031* (2013.01)

(58) Field of Classification Search
    CPC ........ B01D 2201/188; B01D 2201/282; B01D 2201/287; B01D 2201/306; B01D 2201/4038; B01D 35/0273; F01M 11/0004; F01M 11/02; F01M 11/03; F01M 2011/0029; F01M 2011/031; F01M 2001/1057; F01M 2001/1071; F01M 1/10; F16N 39/06
    USPC ........................................................ 123/1 A
    See application file for complete search history.

(56) References Cited

U.S. PATENT DOCUMENTS

| | | | |
|---|---|---|---|
| 2003/0116493 A1 | 6/2003 | Elsegood | |
| 2004/0245179 A1* | 12/2004 | Elsegood | ................ B03C 1/286 210/695 |
| 2006/0219620 A1 | 10/2006 | Suga | |
| 2007/0267417 A1* | 11/2007 | Miyachi | ................ F15B 21/041 220/564 |
| 2014/0230224 A1 | 8/2014 | Unger et al. | |
| 2016/0310876 A1* | 10/2016 | Ben-Horin | ........... B01D 29/682 |
| 2017/0167330 A1 | 6/2017 | Lee et al. | |
| 2019/0024543 A1* | 1/2019 | Viola | ................. F01M 11/0458 |
| 2020/0031570 A1* | 1/2020 | Ishizuka | .............. B01D 29/336 |

FOREIGN PATENT DOCUMENTS

| | | |
|---|---|---|
| CN | 106351711 A | 1/2017 |
| CN | 107191238 A | 9/2017 |
| DE | 10257011 A1 | 6/2004 |
| DE | 102014010388 A1 | 1/2016 |
| EP | 2236779 A1 | 10/2010 |
| FR | 2041383 A7 | 1/1971 |
| GB | 2171024 A | 8/1986 |
| JP | S5814916 U | 1/1983 |
| JP | 2004251239 A | 9/2004 |
| WO | 2010102616 A1 | 9/2010 |
| WO | 2010132632 A1 | 11/2010 |
| WO | 2014079591 A1 | 5/2014 |

OTHER PUBLICATIONS

International Search Report and Written Opinion dated Nov. 26, 2018 in corresponding International PCT Application No. PCT/EP2018/051006, 12 pages.

International Preliminary Report on Patentability dated Jan. 16, 2020 in corresponding International PCT Application No. PCT/EP2018/051006, 14 pages.

European Search Report dated Jun. 14, 2022 in corresponding European Patent Application No. 22158479.0, 6 pages.

* cited by examiner

ENGINE OIL SYSTEM AND A LID

CROSS-REFERENCE TO RELATED APPLICATIONS

This application is a U.S. National Stage application of PCT/EP2018/051006, filed Jan. 16, 2018, and published on Jul. 25, 2019, as WO 2019/141348 A1, all of which is hereby incorporated by reference in its entirety.

TECHNICAL FIELD

The invention relates to an engine oil system for supplying oil to oil using components in a vehicle. More specifically, the engine oil system comprises an oil filter for cleaning oil in the engine oil system. The invention further relates to a lid, such as a filter lid, for closing an opening in an oil pan.

The invention is applicable on vehicles, in particularly low, medium and heavy duty vehicles commonly referred to as trucks. Although the invention will mainly be described in relation to a truck, it may also be applicable for other type of vehicles.

BACKGROUND

Engine oil systems are used in a vehicle to provide oil for oil using components, such as e.g. moving parts in the engine. The engine oil system typically comprises an oil pan or oil sump functioning as an oil reservoir below the engine, and an oil pump for pressurizing the oil and enabling transport of the oil from the oil pan to the oil using components.

During operation of the engine and the engine oil system, the oil becomes soiled by debris and impurities, such as wear particles originating from engine operation, and the function of the oil is impaired. Thus, an engine oil system is often equipped with an oil filter for cleaning the oil. Typically, oil is passed through the oil filter whereby the debris and impurities are captured by the filter material in the oil filter. Thus, the oil filter is most often associated with a pressure drop, and therefore the oil filter is arranged downstream of the oil pump in order to receive oil with a sufficient oil pressure to overcome the pressure drop. The oil filter may be subjected to oil pressures above 10 bars, and therefor needs a proper installation in the engine oil system. Hence, an oil filter housing holding the filter material, and a filter lid securely attached to the oil filter housing are typically needed. Such installations are relatively complex and may be bulky to withstand the relatively high oil pressures.

Furthermore, as the filter lid needs to be leaked-tight and withstand the relatively high oil pressures, it is typically screwed into the filter housing in order to securely fasten the filter lid to the filter housing. Hereby, maintenance of the oil filter, or filter change in which the filter material is renewed or cleaned, requires the rather time consuming act of unscrewing the filter lid, performing the maintenance or filter change, and thereafter again screwing the filter lid into the filter housing. Moreover, during maintenance or filter change, remaining oil in the oil filter may pour out resulting in a messy handling of the oil filter for the service technician performing the maintenance or filter change. There is thus a need in the industry to improve the engine oil system, and especially improve the oil filter in order to mitigate the above mentioned problems.

SUMMARY

In view of the above-mentioned and other drawbacks of the prior art, the object of the present inventive concept is to provide an engine oil system providing an improved handling of the oil filter, and more specifically to enable or more efficient maintenance of the oil filter, and/or oil filter change. The object is achieved by an engine oil system according to claim 1.

According to a first aspect of the invention, an engine oil system for supplying oil to oil using components in a vehicle is provided. The engine oil system comprises:

an oil pan for holding oil received from said oil using components, an oil pump fluidly connected to said oil pan for pumping oil from said oil pan to said oil using components, and an oil filter configured for cleaning said oil, said oil filter having a filter inlet for receiving oil to be cleaned, and a filter outlet for discharging oil from said oil filter, wherein said oil filter is arranged in said oil pan such that, in use, said filter outlet discharges oil into said oil pan.

By the provision of an engine oil system comprising an oil filter arranged such that the oil filter outlet discharges oil into said oil pan, maintenance of the oil filter, and/or oil filter changes can be carried out more efficiently. For example, a less messy handling of the oil filter can be achieved as there will be no, or very little, oil remaining in the oil filter when the oil pan has been drained, as oil in the oil filter is discharged directly into the oil pan from said filter outlet. Thus, the engine oil system provides an improved work environment for an oil filter technician. Moreover, by having the oil filter arranged in said oil pan, conventional filter housing can be omitted resulting in a lower total weight of the engine oil system, and/or in a less space consuming engine oil system. Another advantage of having the oil filter arranged in the oil pan such that, in use, said filter outlet discharges oil into said oil pan, is that maintenance work of the oil filter, or oil filter changes, can be carried out faster, at least partly due to the relatively accessible location of the oil filter in the oil pan, and/or at least partly due the low amount of remaining oil in the oil filter after oil drainage of the oil pan. Another advantage of the present invention is that there is no need to pre-fill the oil filter to secure access to oil during start-up after an oil filter change, as oil from the oil pan, or oil directly from the oil pump, will serve such purpose.

Another advantage of having the oil filter arranged in said oil pan such that, in use, said filter outlet discharges oil into said oil pan, is that the size, shape, and/or type of the oil filter can be varied more freely as the oil pan is less constraining compared to a conventional oil filter housing. Thus, and according to at least one example embodiment, the oil filter may be arranged inside of said oil pan such that at least the filter outlet is arranged in said oil pan. Furthermore, as the oil filter is not arranged between the oil pump and the oil using components, the oil filter needs not to be designed to handle oil pressures corresponding to the oil using components, but needs only to be designed to handle oil pressures corresponding to the pressure drop over the oil filter.

It should be understood that by stating that said oil pump is arranged for pumping oil from said oil pan to said oil using components, it is arranged for providing the energy needed to transport oil from said oil pan to said oil using components. The oil is typically transferred in oil supply lines, fluidly connected to said oil pump.

According to at least one example embodiment, said oil filter is arranged downstream of said oil pump in said engine oil system such that, in use, said filter inlet receives pressurized oil from said oil pump.

Hereby, oil can be provided to the oil filter at a sufficiently high oil pressure enabling oil to be pressed, or pushed, through the oil filter. In other words, by arranging the oil filter such that, in use, said filter inlet receives pressurized oil from said oil pump, the pressure drop which is associated with the oil filter can be overcome. It should be understood that by stating that the oil filter is arranged downstream of said oil pump in said engine oil system such that, in use, said filter inlet receives pressurized oil from said oil pump, the oil received in the filter inlet has not passed, or been used by, any of the oil using components in the present oil pressure cycle. That is, the oil received in the filter inlet stems from the oil pan, which has been pressurized by the oil pump, and subsequently been directly transferred to the oil filter without passing the oil using components. In other words, the oil filter may be described as being arranged directly downstream of said oil pump. Hereby, an internal oil flow path from the oil pan to the oil pump further to the oil filter and back to the oil pan, not including passage through any of the oil using components, is provided.

According to at least one example embodiment, the oil system comprises:
an oil supply line arranged downstream of said oil pump for transferring oil to said oil using components, and
an oil filter line arranged downstream of said oil pump for transferring oil to said oil filter, wherein said oil supply line and said oil filter line are arranged to receive different sub-portions of a pressurized oil flow from said oil pump.

By transferring only a sub-portion of the oil through the oil filter at a time, an energy efficient cleaning of the oil, while still providing for sufficiently clean oil over time, is provided. Hence, for a certain oil pressure cycle, a first sub-portion of the oil is cleaned by the oil filter, while a second sub-portion of the oil is transferred to the oil using components. In other words, the oil in the engine oil system is continuously being at least partly cleaned. Thus, over time, all oil in the engine oil system will have been transferred through the oil filter, and clean oil in the engine oil system is provided. According to at least one example embodiment, the oil supply line and the oil filter line are parallel to each other. Thus, according to at least one example embodiment, the oil filter is arranged in parallel to said oil using components.

It should be understood that an oil pressure cycle may be defined as the transfer of oil from the oil pan, to the oil pump and subsequent transfer back to the oil pan, via the oil using components and/or the oil filter.

The oil supply line and/or the oil filter line may be pipes arranged for transferring oil in the engine oil system. The oil supply line may e.g. be a pipe or a network of piping fluidly connected to the oil pump and being arranged between the oil pump and the oil using components for transferring oil from the oil pump to the various oil using components. The oil filter line may e.g. be a pipe fluidly connected to the oil pump and fluidly connected to the oil filter via the filter inlet (i.e. being arranged between the oil pump and the filter inlet of the oil filter), and being arranged for transferring oil from the oil pump to the filter inlet.

The engine oil system may further comprise an oil pump supply line arranged between the oil pan and the oil pump, and being arranged for transferring oil from the oil pan to the oil pump.

According to at least one example embodiment, the sub-portion of said pressurized oil flow from said oil pump received by said oil filter line is between 0-100%, such as e.g. between 0-90%, 0-80%, or 0-70%, or 0-60%, or 0-50%, or 0-40%, or 0-30%, or 0-20%, or 0-10% of the total flow of pressurized oil from said oil pump. By having a relatively smaller sub-portion of the pressurized oil flow from said oil pump to be received by said oil filter line compared to the sub-portion received by said oil supply line, an even more energy efficient cleaning of said oil is provided. On the other hand, by having a relatively larger sub-portion of said pressurized oil flow from said oil pump to be received by said oil filter line compared to the sub-portion received by said oil supply line, a larger amount of oil can be cleaned in each oil pressure cycle.

According to at least one example embodiment, the engine oil system comprises an oil flow regulating device arranged to vary the sizes of the sub-portions of the pressurized oil flow from said oil pump to be received by said oil filter line and said oil supply line, respectively. Hereby, the flow of oil through the oil filter can be varied and adapted based on the needs of cleaning. For example, if the oil in said oil engine system is relatively clean, the sub-portion of the pressurized oil flow to said oil filter line can be relatively small compared to said oil supply line, for example between 0-20% or between 0-10% of the total flow of pressurized oil from said oil pump. On the other hand, if the oil in said oil engine system is relatively dirty, as may be the case close to a needed oil change, the sub-portion of the pressurized oil flow to said oil filter line can be relatively large compared to said oil supply line, for example between 50-100% or between 50-80% of the total flow of pressurized oil from said oil pump.

According to at least one example embodiment, said oil filter line is a branch from said oil supply line.

Hereby, an efficient but yet simple way of dividing the pressurized oil flow from said oil pump between the oil using components and the oil filter is provided. The branch may e.g. be a Y-shaped branch or a T-shaped branch. According to at least one alternative example embodiment, said oil supply line is a branch from said oil filter line.

According to at least one example embodiment, the engine oil system comprises at least one oil return line arranged between said oil using components and said oil pan for transferring oil from at least one of said oil using components to said oil pan. According to at least one example embodiment including such oil return line, said oil filter is arranged downstream of said oil return line in said engine oil system such that, in use, said filter inlet receives oil from said oil return line.

Thus, for such embodiments, instead, or as an addition to, of receiving oil directly from said oil pump, the oil filter receives oil from at least one of the oil using components which it is in fluid contact with. In other words, the oil filter may be arranged, in a fluid flow direction, between the oil return line and the oil pan. In other words, oil that is transferred from said oil using components via said oil return line enters the oil pan via said oil filter. For such embodiments, the oil pressure of the oil received by the filter inlet has typically been reduced by being transferred via the oil using component(s), and might not be pressurized by any other means than gravity and the size of the oil column potentially accumulated on the oil filter upstream of the filter inlet. Thus, typically, the oil filter needs to be adapted to enable oil flow at such relatively low oil pressures via the oil filter. For example, the oil filter may be a magnetic plate which is arranged inside of the oil pan, and which is arranged to receive oil via the oil return line and configured for collecting any magnetic particles in the oil.

According to at least one example embodiment, said oil pan comprises an interior volume for holding said oil, and wherein at least said filter outlet is arranged in said interior volume.

Thus, the oil filter is arranged to, in use, discharge oil into said interior volume holding said oil from the oil using components. Hereby, the oil from said oil filter is mixed with the oil held in the interior volume of the oil pan.

The oil pan typically comprises a housing (i.e. an oil pan housing) surrounding said interior volume. Moreover, the oil pan is typically arranged below the engine of the vehicle, as seen along a vertical axis following the direction of gravity. The oil pan typically comprises the lowest part of the engine oil system in order to enable oil from said oil using components to be transferred to said oil pan by means of gravity.

According to at least one example embodiment, said oil filter comprises a filter insert for cleaning said oil, wherein said engine oil system comprises a filter lid arranged to close an opening in the housing of the oil pan, wherein said oil filter can be accessed by removing said filter lid whereby said filter insert can be removed via said opening.

Hence, the filter insert can be accessed, and removed, by the opening of the oil pan housing. Thus, a simple but yet effective way of maintaining and/or removing the filter insert is provided. The filter lid is typically sealingly connected to the housing of the oil pan in order to close said opening. For embodiments comprising a filter insert, reference to an oil filter change is typically to be understood as change of the filter insert.

According to at least one example embodiment, the oil filter is arranged inside of said oil pan such that the filter insert is arranged in said oil pan. Thus, at least a part of the oil filter is arranged inside the oil pan. This is advantageous as no separate housing for the filter insert outside of said oil pan is needed.

It should be understood that the filter insert typically comprises a filter material body, which e.g. may be in the form of a cylindrical folded paper structure defining an inner space. However, as the oil filter is arranged inside the oil pan such that, in use, said filter outlet discharges oil into said oil pan, and is thus not restricted to the shape of a conventional filter housing, other shapes of the filter insert and the filter material body is conceivable, for example square-shapes or parallelepiped-shapes. The filter insert may further comprise a first end panel arranged on a first side of the filter material body and a second end panel arranged on a second side, being axially distant from said first side, of the filter material body. The first end panel and/or the second end panel may be perpendicular an axial axis of the filter insert. However, at least one of the first end panel and the second end panel may be non-perpendicular to said axial axis.

According to at least one example embodiment, said oil filter comprises said filter lid. Hence, reference to the oil filter may include reference to the oil filter lid. However, as the filter lid may be a separate component to the filter insert, and as the filter lid serves to close and open an opening in the oil pan housing, which opening may serve other purposes than providing accessibility and/or removal of the filter insert, the filter lid may be considered not to be comprised in the oil filter but rather be comprised in the engine oil system or the oil pan.

According to at least one example embodiment, said filter lid is connected to said filter insert in such a way that said filter insert is removable from said oil pan together with said filter lid.

Hereby, the filter insert can easily be removed from the oil pan. Thus, by detaching the filter lid from the housing of the oil pan, the filter insert can be removed together with the filter lid. Hereby, maintenance or change of the filter insert can be carried out.

According to at least one example embodiment, the filter insert is releasably connectable to said filter lid. Thus, the filter insert can be detached from the filter lid, and a new filter insert can be attached and connected to the filter lid.

According to at least one example embodiment, said filter insert has a lateral side arranged between said filter inlet and said filter outlet, wherein said engine oil system comprises a filter insert holding structure arranged in said oil pan for holding said filter insert, wherein said filter holding structure comprises a wall arranged circumferentially of said lateral side of said filter insert to guide oil within said filter insert from said filter inlet to said filter outlet.

Hereby, means for providing a well-defined positioning of the filter insert inside of the oil pan is provided. Moreover, the wall of the filter insert holding structure prevents oil from flowing out from the filter insert in undesirable directions. In other words, the wall of the filter holding structure provides guidance of the oil within the filter insert. Described differently, the filter insert and the filter insert holding structure may be arranged and configured to provide a well-defined oil path within the oil filter, said oil path extending from the filter inlet, via said filter insert to said filter outlet, wherein the wall of the filter insert holding structure prevents oil from departing from said oil path.

Moreover, the filter insert holding structure may act as a guiding means during insertion of the filter insert into the oil pan, thus facilitating installation of the filter insert to the oil pan. The wall of the filter insert holding structure may e.g. be referred to as a filter insert wall, or a circumferentially arranged filter insert wall. The wall is typically oil impermeable and may e.g. be made of plastic or metal.

According to at least one example embodiment, said oil filter comprises said filter insert holding structure. Hence, reference to the oil filter may include reference to the filter insert holding structure.

According to at least one example embodiment, said filter insert comprises a plurality of filter elements connected to each other, said filter elements being arranged successively from said filter inlet to said filter outlet, wherein said oil filter is configured and arranged to enable removal of a filter element from said plurality of filter elements and/or addition of a filter element to said plurality of filter elements.

Hereby, the capacity of the oil filter or the filter insert can be varied, and be based on the application. For example, the total filter area of the filter insert may be increased by adding an additional filter element corresponding to the expected drive distance or engine hours to next service. Moreover, at least one of the filter elements may be adapted to filter/capture a specific type or size of debris. According to at least one example embodiment, the different filter elements are adapted to filter/capture debris of different types or different sizes.

According to at least one example embodiment, each one of the filter elements comprises a connecting arrangement configured for connection to another one of said filter elements.

Thus, an easy but yet effective way to connect the filter elements to each other is provided. The connecting arrangement may be configured for a releasable connection between the filter elements, such that the various filter elements can be repeatedly detached and attached to each other.

According to at least one example embodiment, the connecting arrangements of two neighbouring and facing filter elements comprise a male-female connection. This provides for a simple and effective connecting means. According to at least one example embodiment, the connecting arrangements comprise a snap-lock connection, or a bayonet connection. Hence, two neighbouring and facing filter elements may be connected to each other by pushing the two filter elements together whereby the connecting arrangements snap-lock into a connected state, or by a relative turning movement between the two filter elements whereby the male part of the bayonet connection mates with the female part of the bayonet connection.

According to at least one example embodiment, at least one of the filter elements comprises an additive, such as an additive for oxidation control or friction control.

Hereby, at least one of the filter elements may be configured to filter/capture a specific type of debris, and/or be configured to release a substance to the oil to extend the life length of the oil.

According to at least one example embodiment, said oil filter comprises an oil distribution plate comprising a plurality of through holes configured to distribute oil within the oil filter.

This is advantageous, as the oil may be better distributed within the oil filter. The oil distribution plate may preferably be arranged perpendicularly to the axial direction of the oil filter or of the filter insert. For example, the oil distribution plate may be comprised in the filter insert in order to improve the oil distribution within the filter insert. For example, the oil distribution plate may be arranged between two different filter elements to improve the distribution of oil between the two filter elements. Thus, the filter elements may be better utilized.

According to at least one example embodiment, the filter elements in said plurality of filter elements have different filtering capacity, wherein a relatively coarse filter element is arranged closest said filter inlet, and a relatively fine filter element is arranged downstream of said coarse filter element, and said oil distribution plate is arranged between said relatively coarse filter element and said relatively fine filter element.

Thus, the oil distribution plate may distribute the oil exiting the relatively coarse filter element, to enter the relatively fine filter element in an improved manner.

According to at least one example embodiment, the oil distribution plate is comprised in the filter insert holding structure. Such an arrangement may e.g. prevent oil from undesirably by-passing the filter insert in a passage between the filter insert holding structure and the filter elements.

According to at least one example embodiment, said oil distribution plate is magnetic for filtering out metal pieces from the oil.

Hereby, a simple but yet effective way to filter out e.g. metal particles in the oil is provided. According to at least one example embodiment, the filter insert consists of the magnetic oil distribution plate. That is, according to at least one example embodiment, the oil filter is a magnetic oil distribution plate, wherein the filter inlet is a portion of the magnetic oil distribution plate which is configured and arranged for receiving oil e.g. from the oil using components, and wherein the filter outlet is a portion of the magnetic oil distribution plate which is configured and arranged for discharging oil to the remaining oil in the oil pan.

According to at least one example embodiment, said oil filter is horizontally arranged, or said oil filter is vertically arranged, in said oil pan, such that in use, oil flows inside of said oil filter horizontally or vertically, respectively.

It should be noted that the terms "horizontally arranged" and "vertically arranged" are related to the surroundings and the direction of gravity, i.e. vertically arranged is indicating an oil filter which has its axial direction along the direction of gravity, and oil will, in use, be forced to flow through the oil filter along the direction of gravity. Correspondingly, horizontally arranged is indicating an oil filter which has its axial direction perpendicular to the direction of gravity, and oil will, in use, be forced to flow through the oil filter perpendicular to the direction of gravity. Thus, any filter insert, and any filter element and/or any distribution plate comprised in the filter insert, will be arranged to enable such oil flow through the oil filter.

According to a second aspect of the invention, the object is achieved by a lid for closing an opening in an oil pan according to claim 17. The lid, which e.g. is a filter lid, comprises:
  an expandable closing arrangement for closing the opening in said oil pan,
  a first elongated element having a first element connecting portion connected to a first portion of said closing arrangement by a first pivotable connection,
  a second elongated element having a second element connecting portion connected to a second portion of said closing arrangement by a second pivotable connection distant from said first pivotable connection,
wherein said first elongated element and said second elongated element are connected to each other by a pivotable joint enabling said first elongated element and said second elongated element to be arranged:
  in a first relative position in which the first pivotable connection is separated from said second pivotable connection by a first distance in which the expandable closing arrangement is in a first state in which the closing arrangement can pass through said opening, and
  in a second relative position in which the first pivotable connection is separated from said second pivotable connection by a second distance being greater than said first distance in which the expandable closing arrangement is in a second state, or an expanded state, in which the closing arrangement cannot pass through said opening.

Hereby, a lid enabling secure and safe closing of the opening is provided. Moreover, by having an expandable closing arrangement which can be arranged in two different states depending on the relative position of the first and second elongate elements, the closing arrangement can, when being in its first state, be inserted into the opening to be closed, and subsequently be brought into its second state by simply changing the relative position of the first and second elongate elements, and thereby close the opening. Thus, the closing arrangement may be described as closing the opening from the inside of the oil pan. This configuration enables a quick installation of the lid in the opening.

It should be noted that the first and second states of the expandable closing arrangement are typically associated with different extensions or areas. In the first state, in which the closing arrangement can pass through the opening, the extension, or area (which may be referred to as a closing area), of the closing arrangement is relatively small. Correspondingly, in the second state, in which the closing arrangement cannot pass through the opening, the extension, or area, of the closing arrangement is relatively large such that it completely covers the opening. It should be understood that the geometric extension, or the spread of the area, of the closing arrangement is to be measured relative the opening.

In other words, the extension, or area, of the closing arrangement is referred to in geometric relation to the opening. Described differently, the closing arrangement is configurable to vary in size compared to said opening. Thus, an effective and fast closing of the opening can be achieved with the configuration of the lid.

According to at least one example embodiment, said expandable closing arrangement comprises a first connecting part comprising said first portion connected to said first element connecting portion, and a second connecting part comprising said second portion connected to said second element connecting portion, and wherein said expandable closing arrangement further comprises a closing plate which is movably connected to said first connecting part and said second connecting part such that said first connecting part, said second connecting part and said closing plate together forms a closing area which can be expanded.

By providing first and second connecting parts, which are movably connected to a closing plate, an effective way of enabling the expandable closing arrangement to be arranged in different states with different closing areas is provided. The first and the second connecting parts are preferably connected to the closing plate on opposite sides, and may e.g. be slidingly connected to the closing plate. According to at least one example embodiment, the first and second connecting parts are arranged in a first level, and the closing plate is arranged in a second level being different from said first level, wherein the first and second connecting parts connects to the closing plate such that the total area of the first and second connecting parts in said first level, and the closing plate in said second level, corresponds to the closing area of the closing arrangement. By having the first and second connecting parts in a different level compared to the closing plate, the first and the second connecting parts can overlap with the closing plate, and the amount of overlap can vary between the first and second states, in order to vary the size of the closing area. Described differently, and according to at least one example embodiment, in said first state of the closing arrangement, the first and second connecting parts are connected to the closing plate in such a way that the first connecting part is distant from the second connecting part by a relatively small distance. Thus, the amount of overlap between the first and second connecting parts, and the closing plate is relatively large. Correspondingly, in said second state of the closing arrangement, the first and second connecting parts are connected to the closing plate in such a way that the first connecting part is distant from the second connecting part by a relatively large distance. Thus, the amount of overlap between the first and second connecting parts, and the closing plate is relatively small.

According to at least one example embodiment, each one said first connecting part and said second connecting part comprises a locking portion for securing the lid to the oil pan.

This is advantageous, as the locking portion may improve, or secure, the attachment of the lid to the oil pan. Preferably, the locking portions is configured and arranged for mating with an associated structure within the oil pan. The locking portions may e.g. be arranged as hooks, or male protrusions, configured to mate with a corresponding hook, of a female indentation, of the oil pan.

According to at least one example embodiment, said first element comprises a first element handle portion arranged opposite to said first element connecting portion, and wherein said second element comprises a second element handle portion arranged opposite to said second element connecting portion, and wherein said lid is configured:

such that a first relative movement between said first element handle portion and said second element handle portion results in that the closing arrangement is brought into its first state, and such that a second relative movement between said first element handle portion and said second element handle portion, said second relative movement being in opposite direction to said first relative movement, results in that the closing arrangement is brought into its second state.

Hereby, the lid can easily be operated by the use of e.g. the hands of a technician. Thus, no tool or specialized equipment is needed for installing the lid to the opening, and/or removing the lid from the opening. The first and the second element handle portions are preferably elongated elements, which facilitates handling and operation of the lid.

According to at least one example embodiment, said first elongated element comprises a first element intermediate portion arranged between said first element handle portion and said first element connecting portion, and wherein said second elongated element comprises a second element intermediate portion arranged between said second element handle portion and said second element connecting portion, and wherein said pivotable joint is arranged in said first element intermediate portion and said second element intermediate portion.

Thus, the first and the second element handle portions are distant from said pivotable joint. Hereby, the first and the second element handle portions function as levers, and thus facilitates the operation of the lid.

According to at least one example embodiment, said first elongated element and said second elongated element are arranged in an X-shape, e.g. a scissor-like shape.

Such shape is advantageous for changing between the states of the closing arrangements. Thus, the top two legs of the X-shape corresponds to the first and second element handle portions, and the bottom two legs of the X-shape corresponds to the first and second element connecting portions, while the first and second element intermediate portions, comprising the pivotable joint, are arranged in between the respective element handle portions and the respective element connecting portions in the center of the X-shape. Hereby, the relative movement between the first and second element handle portions is relatively easy to implement, and is in a straightforward way related to the relative movement between the first and second element connecting portions causing the size-varying of the closing area of the expandable closing arrangement.

According to at least one example embodiment, the engine oil system of the first aspect of the invention comprises the lid, or filter lid, of the second aspect of the invention.

Thus, the lid described with the second aspect of the invention may be used as the filter lid in the engine oil system of the first aspect of the invention. Hereby, an engine oil system providing an improved work environment, and which enables a fast and effective maintenance work of the oil filter, or change of oil filter, is provided.

Effects and features of this embodiment are largely analogous to those described above in connection with the first and second aspects of the invention.

According to at least one example embodiment, said oil pan comprises a counter locking arrangement arranged on the inside of said oil pan circumferentially around said opening, said counter locking arrangement being configured for mating with a locking portion of said expandable closing arrangement.

This is advantageous, as the locking portion, and the counter locking arrangement improve, or secure, the attachment of the filter lid to the oil pan. The locking portions may e.g. be arranged as hooks, or male protrusions, and the counter locking arrangement may e.g. be arranged as corresponding hooks, of a female indentations.

According to at least one example embodiment, said oil pan comprises a counter holding arrangement arranged inside of said oil pan, and being configured for receiving and holding at least a portion of said expandable closing arrangement in order to act as a counter holding structure for said lid.

Hereby, installation of lid to the opening is improved as the counter holding arrangement provides a well-defined positioning of the lid inside of the oil pan. The counter holding arrangement may e.g. be a portion of the filter insert holding structure.

According to at least a third aspect of the present invention, the object is achieved by a vehicle according to claim 26, the vehicle comprising an engine oil system according to the first aspect of the invention, and/or a lid according to the second aspect of the present invention.

Effects and features of this thirds aspect of the present invention are largely analogous to those described above in connection with the first aspect and/or second aspect of the invention. Embodiments mentioned in relation to the first and second aspects of the present invention are largely compatible with the third aspect of the invention.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

Figure 1:
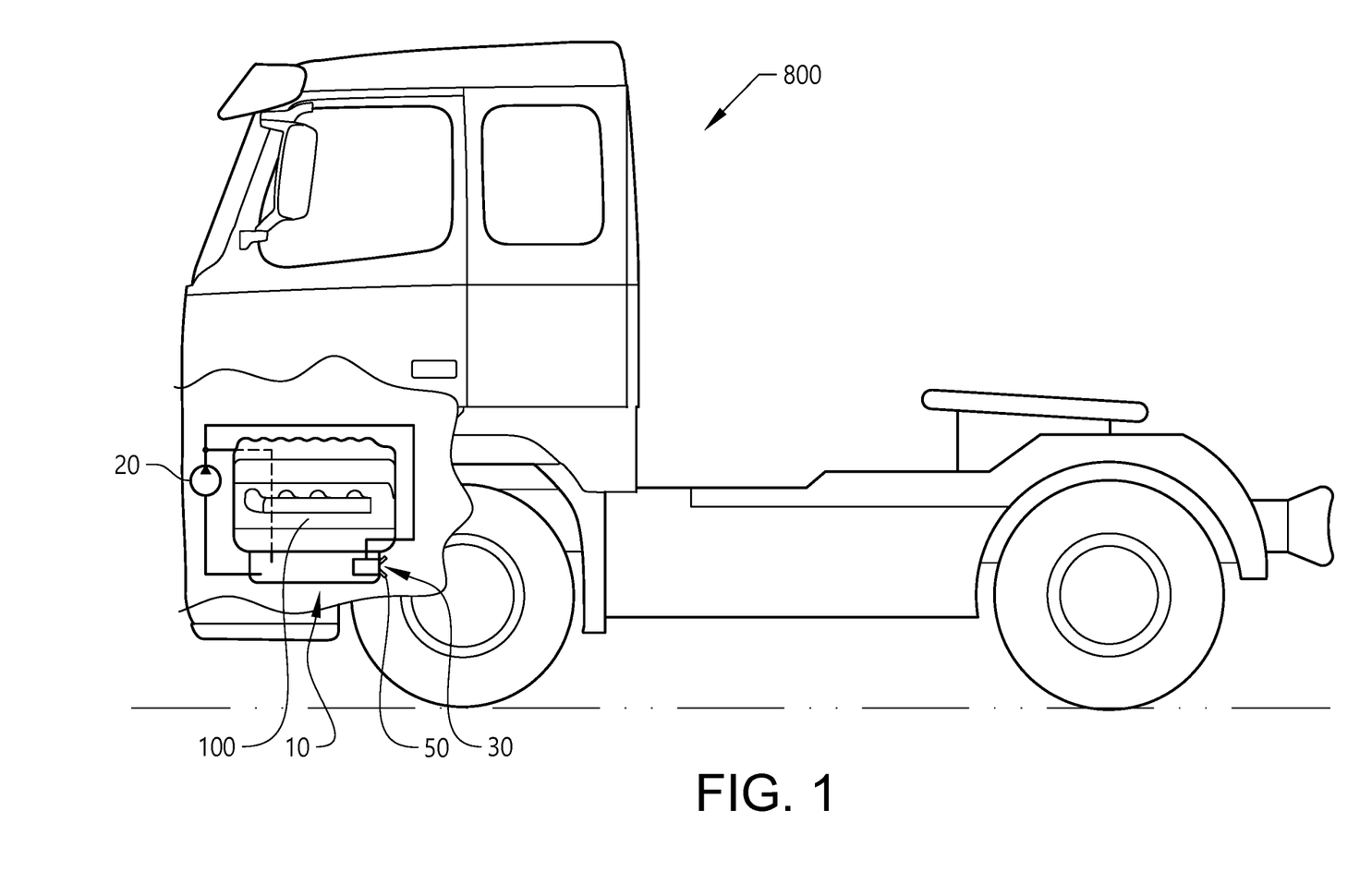
FIG. 1 is a side view of a vehicle comprising an engine oil system according to an example embodiment of the present invention.

With particular reference to FIG. 1, there is provided a vehicle 800 with a combustion engine 100, such as an internal combustion engine 100, and an engine oil system 1 having an oil pan 10, and oil pump 20 and an oil filter 30 according to the present invention. The oil filter 30 is secured in the oil pan by a lid 50. The vehicle 800 depicted in FIG. 1 is a truck 800 for which the inventive concept which will be described in detail below, is particularly suitable for. The engine oil system and the lid 50 will be further elucidated with reference to FIGS. 2-6.

Figure 2:
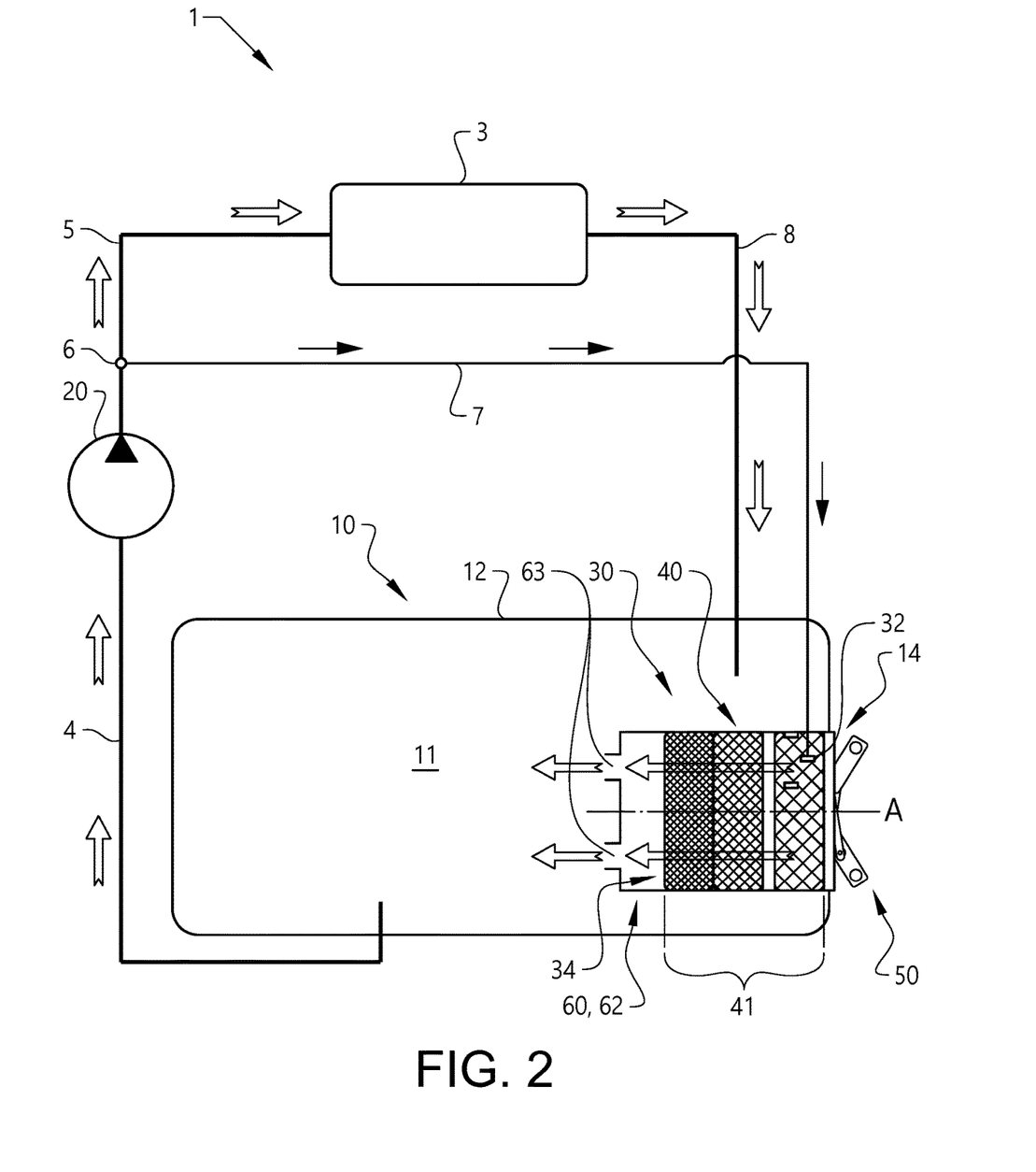
FIG. 2 is a schematic overview of an engine oil system according to an example embodiment of the present invention.

FIG. 2 shows a schematic overview of an engine oil system 1 for supplying oil to oil using components 3 according to one example embodiment of the invention. In the non-limiting example of FIG. 2, the engine oil system 1 comprises an oil pan 10 for holding oil received from the oil using components 3, an oil pump 20 fluidly connected to the oil pan 10 for pumping oil from the oil pan 10 to the oil using components 3, an oil filter 30 configured for cleaning the oil, and a lid 50, here embodied as a filter lid 50 for sealingly securing the oil filter 30 to the oil pan 10.

As seen in FIG. 2, the oil pump 20 is fluidly connected to the oil pan 10 by means of an oil pump supply line 4, and is fluidly connected to the oil using components 3 by means of an oil supply line 5 arranged downstream of the oil pump 20 for transferring oil to the oil using components 5. From the oil using components 3, oil is returned to the oil pan 10 by means of an oil return line 8 arranged between the oil using components 3 and the oil pan 10. It should be noted that the oil return line 8 may correspond to a plurality of different lines or paths for which the oil is returned to the oil pan 10. Moreover in FIG. 2, the engine oil system 1 comprises an oil filter line 7, which is a branch 6 from the oil supply line 5, and is thus arranged downstream of the oil pump 20, for transferring oil to the oil filter 30. Thus, the pressurized oil flow from the oil pump 20 will be divided into different sub-portions, a first sub-portion in the oil filter line 7, and a second sub-portion in the oil supply line 5.

The oil filter 30 is in FIG. 2 arranged inside the oil pan 10, and thus, the oil filter line 7 is arranged to transfer oil from the oil pump 20 to the oil filter 30 inside of the oil pan 10. In other words, the oil filter 30 is arranged downstream of the oil pump 20, in parallel to the oil using components 3, such that, in use, the filter inlet 32 receives pressurized oil from the oil pump 20. More specifically, the oil filter 30 comprises a filter inlet 32 for receiving oil to be cleaned from the oil pump 20 and the oil filter line 7, and comprises a filter outlet 34 for discharging oil from the oil filter 30 into the oil pan 10. Thus, from the oil filter line 7, oil is transferred to the oil filter 30 and the filter inlet 32 before being mixed with the remaining oil in the oil pan 10. As seen in FIG. 2, the oil pan 10 comprises a housing 12, or an oil pan housing 12, surrounding an interior volume 11 for holding the oil in the oil pan 10, and at least a portion of the oil filter 30, such as the filter outlet 34, is arranged in the interior volume 11 of the oil pan 10.

Moreover, the oil filter 30 comprises a filter insert 40 for cleaning the oil. The filter insert in FIG. 2 comprises at least one filter element having a filter material body through which the oil is arranged to pass in order to be filtered (described further with reference to FIG. 4). Hence, the filter material body will capture debris and impurities in the oil and will successively be degraded and in need of maintenance or change. In FIG. 2, the filter inlet 32 is comprised in the filter insert 40, and thus oil from the oil filter line 7 will be directly passed from the oil pump 20 to the oil filter 30 without passing the oil using components 3, or the remaining oil in the oil pan 10. Moreover, the engine oil system 1 of FIG. 2 comprises a filter insert holding structure 60 arranged in the interior volume 11 of the oil pan 10 for holding the filter insert 40. More specifically, the filter insert has a lateral side 41 arranged between the filter inlet 32 and the filter outlet 34, and the filter insert holding structure 60 comprises a wall 62 arranged circumferentially of the lateral side 41 of the filter insert 40 to guide oil within the filter insert 40. The wall 62 extends from the filter inlet 32 to the filter outlet 34 and thus, oil being received by the oil filter 30 and the filter inlet 32 cannot pass out to the remaining oil in the interior volume 11 of the oil pan 10 without passing through the oil filter 30 and the filter outlet 34. It should be noted that in FIG. 2, the wall 62 extends beyond the filter insert 40 for allowing the filter insert 40 to be increased and still being held in the filter insert holding structure 60 (further discussed with reference to FIG. 4). Thus, the filter outlet 34 may be referred to as the interface between the end portion of the filter insert 40, and the remaining oil in the oil pan, or as a cross section 63 of the filter insert holding structure 60 extending between the end portions of the wall 62.

The filter lid 50 is arranged to close an opening 14 of the oil pan housing 12. For the embodiment of the engine oil system 1 of FIG. 2, the filter lid 50 is connected to the filter insert 40, and thus, the filter insert 40 is removable from the oil pan 10 together with the filter lid 50. Hereby, a simple and effective handling of the filter insert 40 is provided.

It should be understood that the oil using components which, in FIG. 2 collectively are referred to by the box 3, may comprise any type of component using engine oil for e.g. lubrication or cooling, such as bearings, pistons or piston liners.

Figure 3:
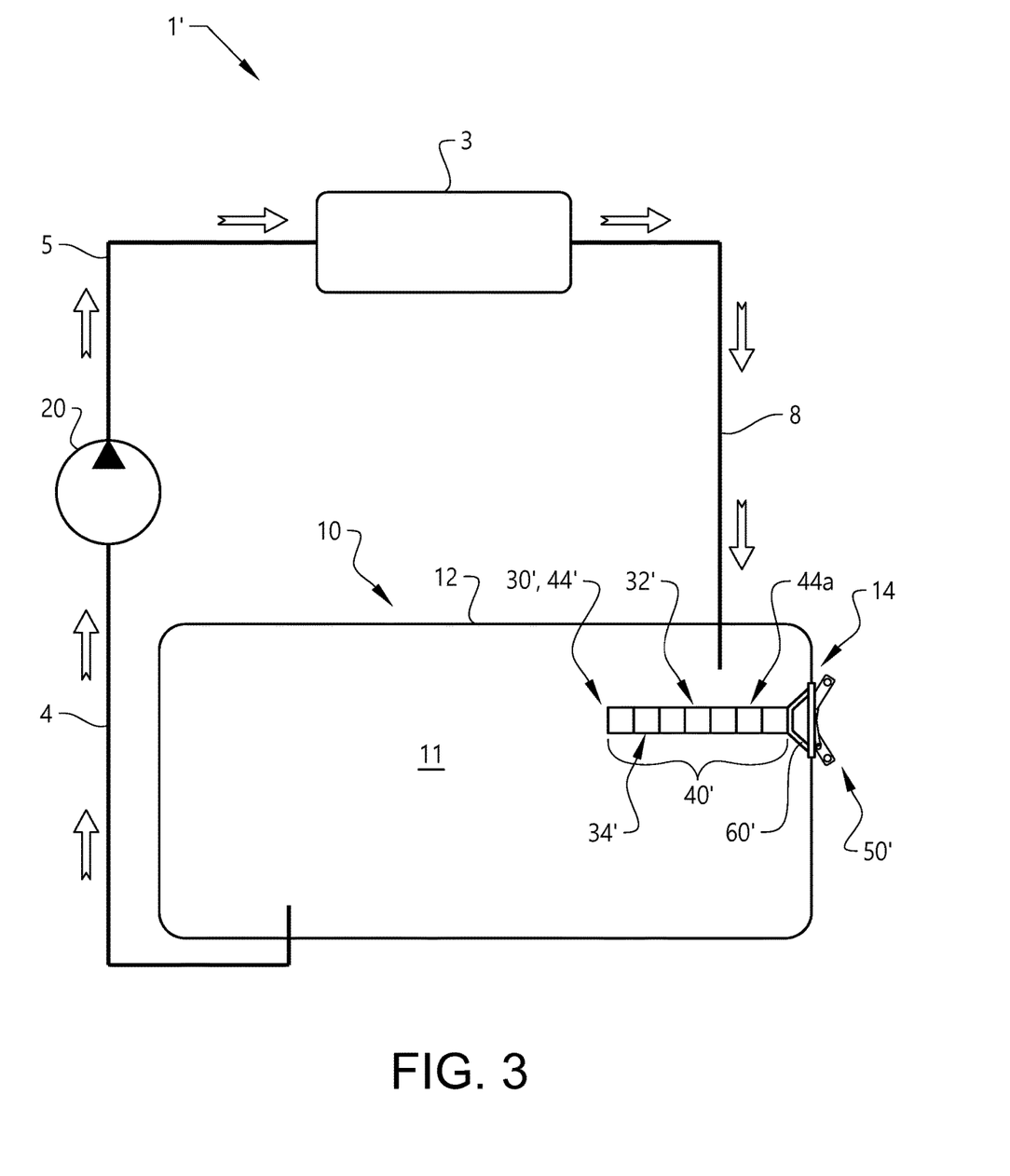
FIG. 3 is a schematic overview of an engine oil system according to another example embodiment of the present invention.

Turning to FIG. 3 showing an engine oil system 1' very similar to that described with reference to FIG. 2, why the same reference numerals are used for like features. The main differences between the engine oil systems 1, 1' of FIG. 2 and FIG. 3 are related to the oil filter 30' and the filter lid 50', and thus, focus will now be drawn to these components of the engine oil system 1'.

As in FIG. 2, the oil filter 30' of the engine oil system 1' of FIG. 3 comprises a filter insert 40' being arranged inside of the interior volume 11 of the oil pan 12. In contrast to the filter insert 40 of FIG. 2, which comprises a filter material body through which the oil is to be passed in order to be cleaned, the filter insert 40' of FIG. 3 comprises, or consists of, an oil distribution plate 44' comprising a plurality of through holes 44A configured to distribute oil within the oil filter 30'. The oil distribution plate 44' in FIG. 3 is magnetic for filtering out metal pieces from the oil. Thus, oil being in contact with the oil distribution plate 44' will be cleaned from metal pieces which are magnetically attached to the oil distribution plate 44'.

Moreover, in FIG. 3, no separate oil filter supply line is present, and the oil filter 30' is arranged downstream of the oil return line 8. Thus, the complete flow of oil will be cleaned by oil filter 30', or stated differently, all oil an oil pressure cycle will pass the oil filter 30'. Correspondingly to the oil filter 30 of FIG. 2, the oil filter 30' of FIG. 3 comprises a filter inlet 32' being a portion of the magnetic oil distribution plate which is configured and arranged for receiving oil from the oil return line 8. For example, the oil distribution plate 44' may be arranged in the interior volume 11 of the oil pan 12 such that it, in use, receives the complete flow of oil from the oil return line 8, and it may be configured with a downwardly inclination or angle from the filter inlet 32' to end portions of the oil distribution plate 44' to enable oil to flow from the filter inlet 32' over the oil distribution plate 44'. Correspondingly, the oil filter 30' comprises a filter outlet 34', or a plurality of filter outlets 34', being a portion, or portions, of the oil distribution plate 44' from which oil discharges from the oil filter 30' to the remaining oil in the oil pan 10. The remaining oil in the oil pan 10 here being oil that has already passed the oil filter 30'. For example, the oil distribution plate 44' may be arranged above the remaining oil in the oil pan 10, by a corresponding filter insert holding structure 60' such that oil discharges from the oil filter 30' by dripping, or flowing, off the oil distribution plate 44'.

Similar to FIG. 2, in FIG. 3, the filter lid 50' is arranged to close an opening 14 of the oil pan housing 12. Correspondingly to FIG. 2, the filter lid 50' is connected to the filter insert 40', i.e. here the oil distribution plate 44', and thus, the filter insert 40' may be removed from the oil pan 10 together with the filter lid 50', and the metal particles attached to the oil distribution plate 44' may be removed and the filter insert 40' re-used. Hereby, a simple and effective handling of the filter insert 40' is provided.

Figure 4:
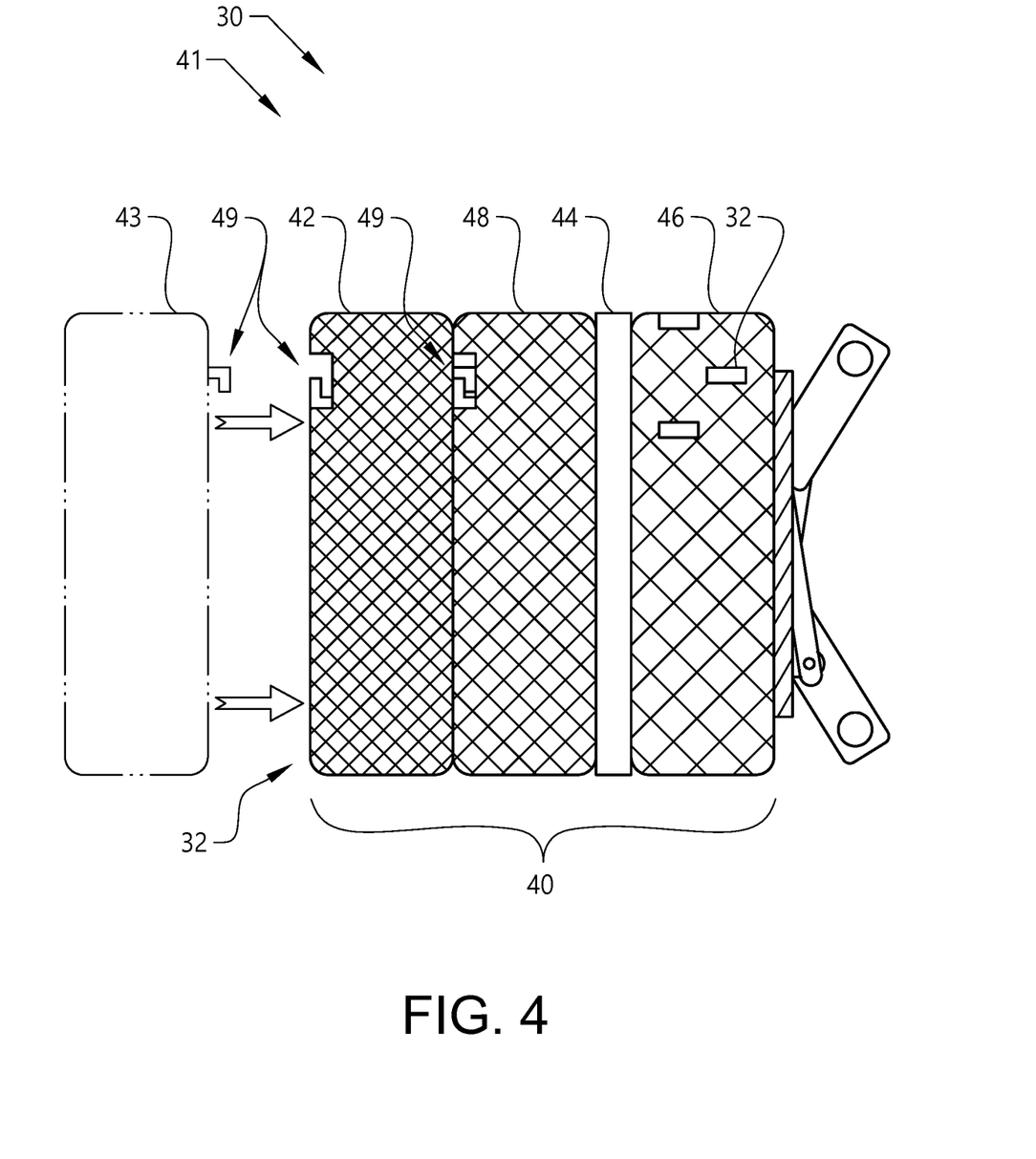
FIG. 4 is a cross sectional view of a filter lid and a filter insert, according to one example embodiment of the invention.

Turning to FIG. 4, showing an example embodiment of the oil filter 30 and the filter insert 40 of FIG. 2. The filter insert 40 comprises a plurality of filter elements 41 connected to each other. The filter elements 41 is arranged successively from the filter inlet 32 to the filter outlet 34, and comprises a first filter element 46 comprising the filter inlet 32, a second filter element 48, and a third filter element 42, each one of the filter elements 46, 48, 42 comprises a filter material body through which the oil is arranged to pass in order to be filtered. Moreover, the first, second and third filter elements 42, 46, 48 have different filtering capacities, such that the first filter element 46 has a relatively coarse filter material body (i.e. a filter material body with pores or channels which are relatively large), the third filter element 42 has relatively fine filter material body (i.e. a filter material body with pores or channels which are relatively small), and the second filter element 48 has a filter material body with a capacity between the first filter element 48 and the third filter element 42. In FIG. 4, the filter insert 40 is further equipped with an oil distribution plate 44 arranged between the first filter element 46 and the second filter element 48, in order to improve the distribution of oil between the two filter elements 46, 48. The oil distribution plate 44 typically comprises a plurality of through holes configured to distribute oil within the filter insert 40 oil filter 30.

Moreover, as shown in FIG. 4, the filter elements 41 comprises a connecting arrangement 49 configured for connection to another one of the filter elements 41, or to the oil distribution plate 44 (in FIG. 4 the second and third filter elements 46, 42 are shown as being equipped with connecting arrangements 49, however, typically each connection between filter elements 41 and/or between a filter element and the oil distribution plate 44 may be embodied by such connecting arrangements). As shown in FIG. 4, the facing sides of the second and third filter elements 46, 42 comprise the connecting arrangements 49 in the form of a male-female connection 49.

Thus, it should be noted that the connecting arrangements 49 typically provide a releasable connection, and thus filter elements can be removed from, or added to, the filter insert 40. For example, the third filter element 42 may be detached from the second filter element 48 by releasing the male-female connection 49, and thus the third filter element 42 may be removed from the filter insert 40. Correspondingly, an additional filter element 43, here embodied as a fourth filter element 43 may be added to the filter insert by attaching it to e.g. the third filter element 42, or the second filter element 48. Thus, the total filter area of the filter insert 40 can be increased in a simple manner.

According to at least one example embodiment, at least one of the filter elements comprises an additive such as e.g. an additive for oxidation control or friction control. Hereby, at least one of the filter elements 41, 43 may be configured to filter/capture a specific type of debris, and/or be configured to release a substance to the oil to extend the life length of the oil.

Figure 5:
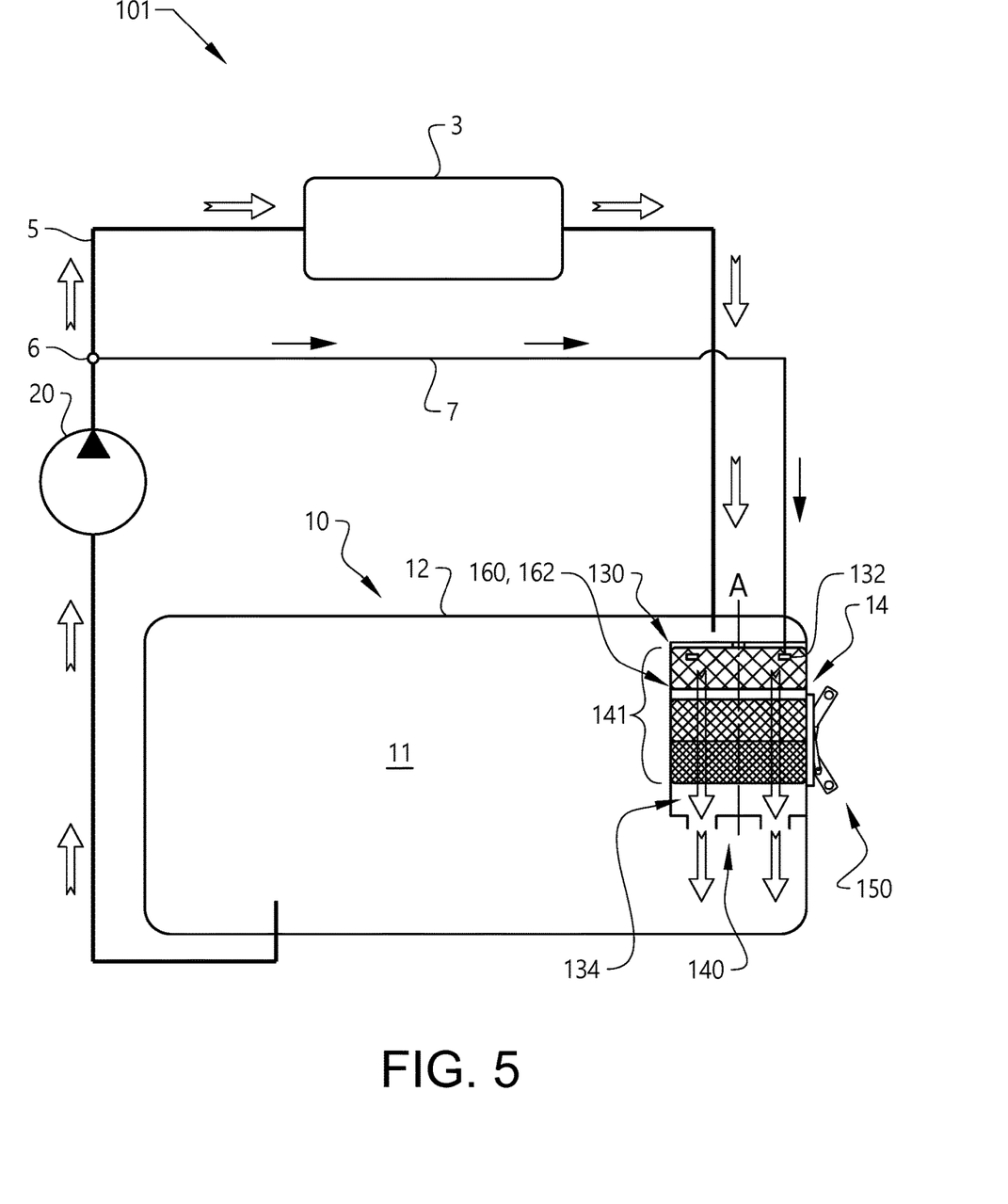
FIG. 5 is a schematic overview of an engine oil system according to yet another example embodiment of the present invention.

Turning to FIG. 5 showing an engine oil system 101 very similar to that described with reference to FIG. 2, why the same reference numerals are used for like features. The main differences between the engine oil systems 1, 101 of FIG. 2 and FIG. 5 are related to the arrangement of the oil filter 130 and the filter insert 140, and thus, focus will now be drawn to these components of the engine oil system 101.

As in FIG. 2, the oil filter 130 of the engine oil system 101 of FIG. 5 comprises a filter insert 140 being arranged inside of the interior volume 11 of the oil pan 12, and the filter insert 140 comprises at least one filter element having a filter material body through which the oil is arranged to pass in order to be filtered (described further with reference to FIG. 4). In contrast to the filter insert 40 of FIG. 2, which is arranged horizontally such that an axial axis A of the filter insert 40 is perpendicular to a vertical axis extending along the direction of gravity, the filter insert 140 of FIG. 5 is arranged vertically, i.e. the axial axis A of the filter insert 140 is extending along the direction of gravity. Hence, in FIG. 5, oil will be forced vertically through the filter insert 140, and in FIG. 2, oil will be forced horizontally through the filter insert 40.

The filter lid 150 in FIG. 5 is typically not connected to the filter insert 140, but removal of the filter lid 150 from the opening 14 in the oil pan housing 14 provide access to the filter insert 140, and one or more of the corresponding filter elements, and/or oil distribution plate, comprised in the filter insert 140. According to at least one example embodiment, the opening 14 of the oil pan housing 12 is sized and dimensioned for enabling removal of the complete filter insert 140. According to at least one example embodiment, the opening 14 of the oil pan housing 12 is sized and dimensioned for enabling removal of at least the largest filter element comprised in the filter insert 140. Thus, in the latter case, the filter elements may successively be removed from the oil pan 12 and the filter insert 140.

Figure 6A:
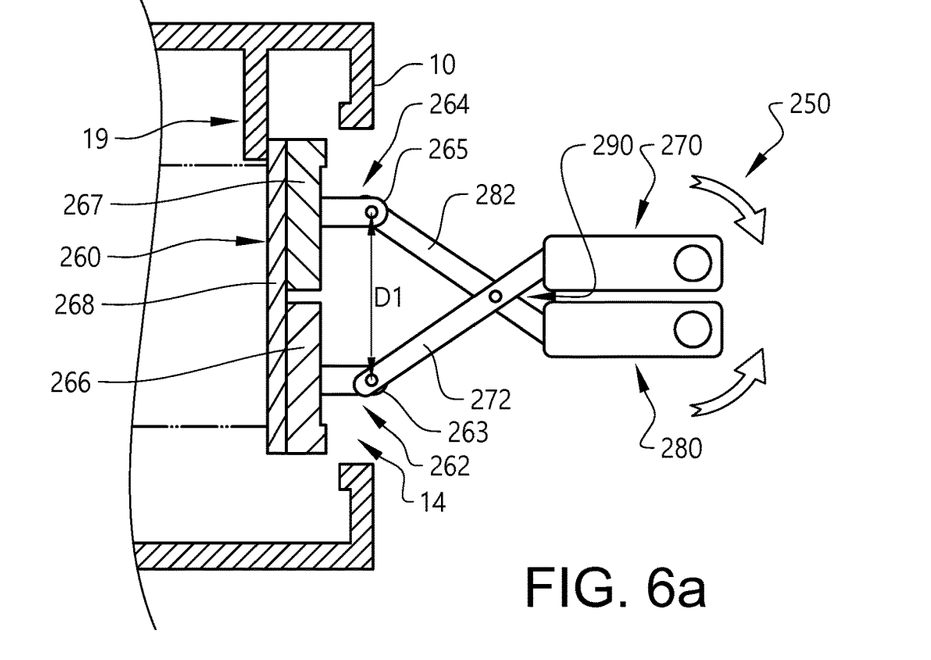
FIGS. 6a-6c are side views showing a lid and portions of an oil pan according to embodiments of the invention.
Figure 6B:
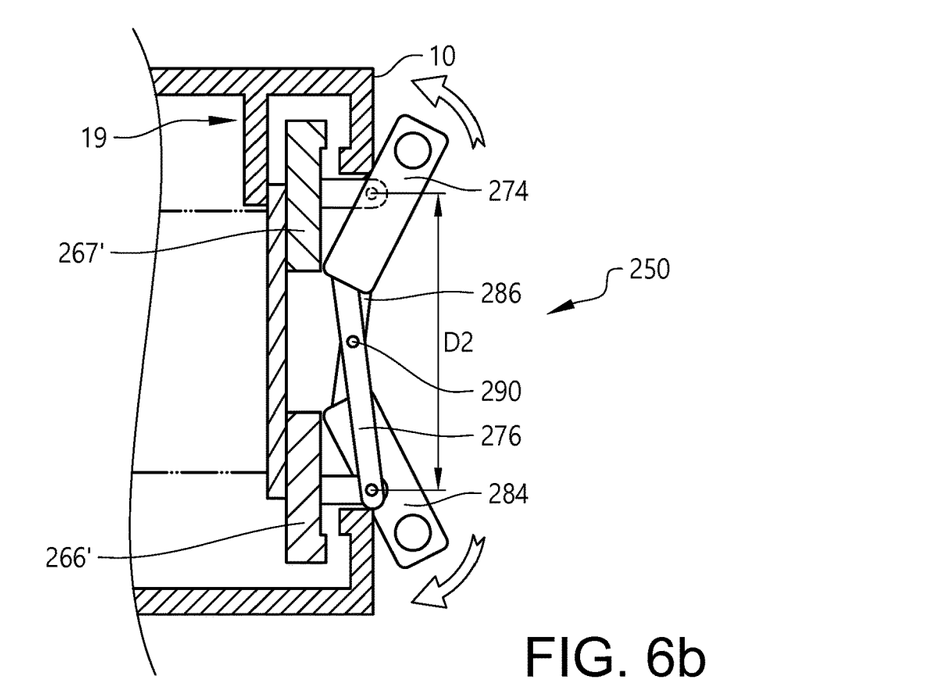
Figure 6C:
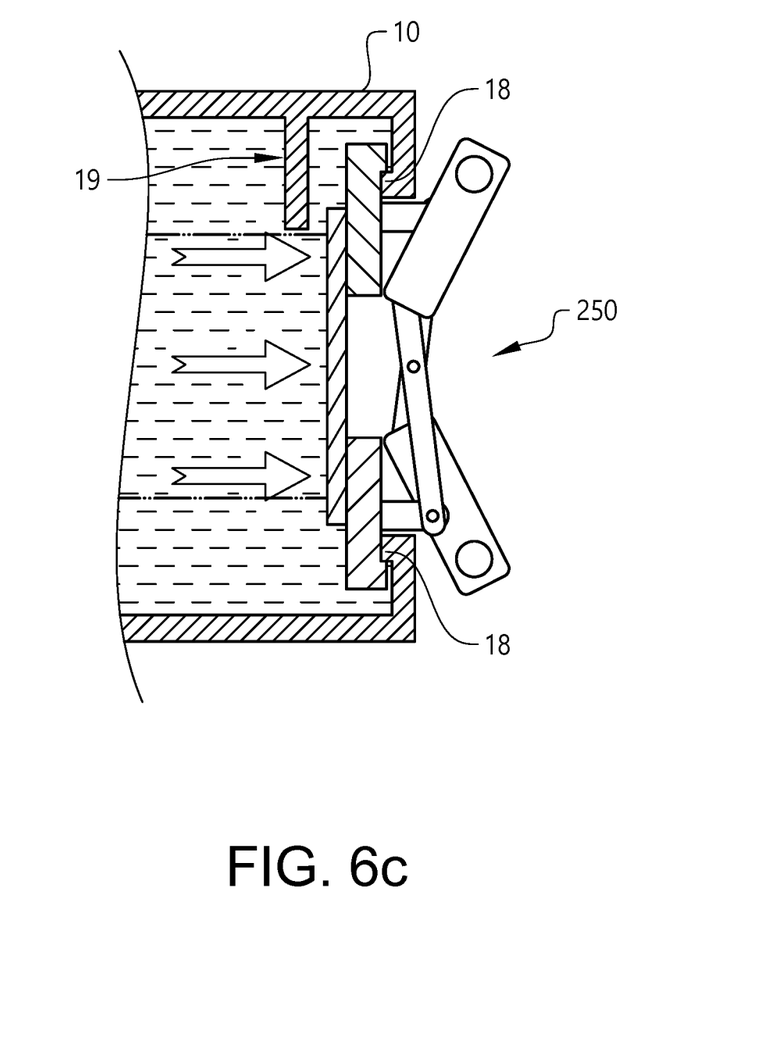

FIGS. 6a, 6b, 6c show a lid 250, such as a filter lid 50, 50', 150 described with reference to FIGS. 1-5. The lid 250 depicted in FIGS. 6a-6c is shown to close an opening 14 in an oil pan 10, for which the inventive concept which will be described in detail below, is particularly suitable for. However, it should be noted that the lid 250 in FIGS. 6a-6c may be used to close openings in tanks or reservoirs other than the oil pan.

The lid 250 of FIGS. 6a-6c comprises an expandable closing arrangement 260 adapted for closing the opening 14 in the oil pan 10, and a first elongated element 270 and a second elongated element 280 configured for arranging the closing arrangement in different states.

The expandable closing arrangement 260 comprises at least three separate parts which are connected to each other such that a closing area of the closing arrangement 260 can be varied. More specifically, the closing arrangement 260 comprises a first connecting part 266, a second connecting part 267 and a closing plate 268. Each one of the first and second connecting parts 266, 267 is movably connected to the closing plate 268 to enable the closing area of the closing arrangement 260 to be varied. In other words, the first connecting part 266, the second connecting part 267 and the closing plate 268 together form a closing area which can be expanded and varied in size.

The first elongated element 270 comprises a first element connecting portion 272, a first element handle portion 274 arranged opposite to the first element connecting portion 272, and a first element intermediate portion 276 arranged between the first element handle portion 274 and the first element connecting portion 272. The first element connecting portion 272 is connected to the first connecting part 266 (i.e. to a first portion 262 of the closing arrangement 260) by a first pivotable connection 263. Correspondingly, the second elongated element 280 comprises a second element connecting portion 282, a second element handle portion 284 arranged opposite to the second element connecting portion 282, and a second element intermediate portion 286 arranged between the first element handle portion 284 and the second element connecting portion 282. The second element connecting portion 282 is connected to the second connecting part 267 (i.e. to a second portion 264 of the closing arrangement 260) by a second pivotable connection 265 distant from the first pivotable connection 263.

As seen in FIG. 6a, the first elongated element 270 and the second elongated element 280 are arranged in an X-shape or a scissor-like shape, in which a pivotable joint 290 between the first elongated element 270 and the second elongated element 280 is arranged in the first and second element intermediate portions 276, 286, in the center of the X-shape. Thus, the top two legs of the X-shape corresponds to the first and second element handle portions 274, 284, and the bottom two legs of the X-shape corresponds to the first and second element connecting portions 272, 282, and owing to the pivotable joint 290 in the center of the X-shape, a movement of the first and second element handle portions 274, 284 results in a movement of the first and second element connecting portions 272, 282, and thereby also a movement of the first and second connecting parts 266, 267 for varying the size of the closing arrangement 260.

More specifically, a first relative movement (indicated by curved arrows in FIG. 6a) between the first element handle portion 274 and the second element handle portion 284 results in that the closing arrangement 260 is brought into in a first state in which the first pivotable connection 263 is separated from the second pivotable connection 265 by a first distance D1, as seen in FIG. 6a. In the first state the expandable closing arrangement 260 can pass through the opening 14. As also seen in FIG. 6a, the oil pan 10 comprises a counter holding arrangement 19 (e.g. being part of filter insert holding structure 60 as described with reference to FIG. 2) arranged inside of the oil pan 10. The counter holding arrangement 19 is typically arranged and configured for receiving and holding at least a portion of the expandable closing arrangement 260, in FIG. 6a-6c a portion of the closing plate 268, in order to act as a counter holding structure for the lid 250 and thereby guide and facilitate installation of the lid 250 into the opening 14.

Moreover, a second relative movement between the first element handle portion 274 and the second element handle portion 284, the second relative movement being in opposite direction to the first relative movement (indicated by curved arrows in FIG. 6b), results in that the closing arrangement 260 is brought into a second state in which the first pivotable connection 263 is separated from the second pivotable connection 265 by a second distance D2 being greater than the first distance D1, as seen in FIGS. 6b and 6c. The second state may be referred to as an expanded state, as the first and second connecting parts 266, 267 has been separated further form each other compared to in the first state, and thus, the closing area of the closing arrangement 260 has been increased. In this second state, or expanded state, the closing arrangement 260 fully covers the opening and cannot pass through the opening 14 as shown in FIGS. 6*b* and 6*c*, and thus, the closing arrangement 150 closes the opening 14.

As seen in FIG. 6*b* and FIG. 6*c*, the lid 250 will automatically be secured, such as sealingly connected, to the oil pan 10 when oil is present in the oil pan 10 (FIG. 6*c*). Thus, the oil will implement a pressure on the lid 250, which acts on the closing arrangement 260, and as the closing arrangement fully covers the opening 14, and cannot pass the opening 14 in its second state, the lid 250 will be securely held to close the opening 14. To further secure the positioning of the lid 250 to the oil pan 10, each one the first connecting part and 266 the second connecting part 267 comprises a respective locking portion 266', 267' arranged and configured for mating with corresponding counter locking arrangement 18 arranged on the inside of the oil pan 10 circumferentially around the opening 14. The counter locking arrangement 18 and the locking portions 266', 267' may e.g. comprise a male-female connection, such as e.g. a bayonet connection.

It should be noted that the lid 250 of FIGS. 6*a*-6*c* may be used as the filter lid 50, 50', 150 in any one of the engine oil systems 1, 1', 101 of FIGS. 2, 3 and 5. It is however not necessary and any one of the disclosed engine oil systems may however instead be provided with a filter lid of another type. It is to be understood that the present invention is not limited to the embodiments described above and illustrated in the drawings; rather, the skilled person will recognize that many changes and modifications may be made within the scope of the appended claims. For example, as already mentioned the separator may be of another structure than that described in herein.

The invention claimed is:

1. An engine oil system for supplying oil to oil using components in a vehicle, said engine oil system comprising: an oil pan for holding oil received from said oil using components, an oil pump fluidly connected to said oil pan for pumping oil from said oil pan to said oil using components, and an oil filter configured for cleaning said oil, said oil filter having a filter inlet for receiving oil to be cleaned, and a filter outlet for discharging oil from said oil filter, wherein said oil filter is arranged in said oil pan such that, in use, said filter outlet discharges oil into said oil pan, wherein said oil filter comprises a filter insert for cleaning said oil, and wherein said engine oil system comprises a filter lid arranged to close an opening in a housing of the oil pan, wherein said oil filter can be accessed by removing said filter lid whereby said filter insert can be removed via said opening, characterized in that, said filter insert comprises a plurality of filter elements connected to each other, said filter elements being arranged successively from said filter inlet to said filter outlet, wherein said oil filter is configured and arranged to enable removal of a filter element from said plurality of filter elements and/or addition of a filter element to said plurality of filter elements.

2. The engine oil system according to claim 1, wherein said oil filter is arranged downstream of said oil pump in said engine oil system such that, in use, said filter inlet receives pressurized oil from said oil pump.

3. The engine oil system according to claim 1, comprising: an oil supply line arranged downstream of said oil pump for transferring oil to said oil using components, and an oil filter line arranged downstream of said oil pump for transferring oil to said oil filter, wherein said oil supply line and said oil filter line are arranged to receive different sub portions of a pressurized oil flow from said oil pump.

4. The engine oil system according to claim 3, wherein said oil filter line is a branch from said oil supply line.

5. The engine oil system according to claim 1, comprising at least one oil return line arranged between said oil using components and said oil pan for transferring oil from at least one of said oil using components to said oil pan, wherein said oil filter is arranged downstream of said oil return line in said engine oil system such that, in use, said filter inlet receives oil from said oil return line.

6. The engine oil system according to claim 1, wherein said oil pan comprises an interior volume for holding said oil, and wherein at least said filter outlet is arranged in said interior volume.

7. The engine oil system according to claim 1, wherein said filter lid is connected to said filter insert in such a way that said filter insert is removable from said oil pan together with said filter lid.

8. The engine oil system according to claim 1, wherein said filter insert has a lateral side arranged between said filter inlet and said filter outlet, and wherein said engine oil system comprises a filter insert holding structure arranged in said oil pan for holding said filter insert, wherein said filter holding structure comprises a wall arranged circumferentially of said lateral side of said filter insert to guide oil within said filter insert from said filter inlet to said filter outlet.

9. The engine oil system according to claim 1, wherein each one of the filter elements comprises a connecting arrangement for connection to another one of said filter elements.

10. The engine oil system according to claim 1, wherein at least one of the filter elements comprises an additive, such as e.g. an additive for oxidation control or friction control.

11. The engine oil system according to claim 1, wherein said oil filter comprises an oil distribution plate comprising a plurality of through holes configured to distribute oil within the oil filter.

12. The engine oil system according to claim 11, wherein said oil distribution plate is magnetic for filtering out metal pieces from the oil.

13. The engine oil system according to claim 11, wherein the filter elements in said plurality of filter elements have different filtering capacity, wherein a relatively coarse filter element is arranged closest said filter inlet, and a relatively fine filter element is arranged downstream of said coarse filter element, and said oil distribution plate is arranged between said relatively coarse filter element and said relatively fine filter element.

14. The engine oil system according to claim 1, wherein said oil filter is horizontally arranged, or said oil filter is vertically arranged, in said oil pan, such that in use, oil flows inside of said oil filter horizontally or vertically, respectively.

15. A lid, such as e.g. a filter lid, for closing an opening in an oil pan, said lid comprising: an expandable closing arrangement for closing the opening in said oil pan, a first elongated element having a first element connecting portion connected to first portion of said closing arrangement by a first pivotable connection, a second elongated element having a second element connecting portion connected to a second portion of said closing arrangement by a second pivotable connection distant from said first pivotable connection, wherein said first elongated element and said second elongated element are connected to each other by a pivotable jointer enabling said first elongated element and said second elongated element to be arranged: in a first relative position in which the first pivotable connection is separated from said second pivotable connection by a first distance which the expandable closing arrangement is in a first state in which the closing arrangement can pass through said opening, and in a second relative position in which the first pivotable connection is separated from said second pivotable connection by a second distance being greater than said first distance in which the expandable closing arrangement is in a second state, or an expanded state, in which the closing arrangement cannot pass through said opening.

16. The lid according to claim 15, wherein said expandable closing arrangement comprises a first connecting part comprising said first portion connected to said first element connecting portion, and a second connecting part comprising said second portion connected to said second element connecting portion, and wherein said expandable closing arrangement further comprises a closing plate which is movably connected to said first connecting part and said second connecting part such that said first connecting part, said second connecting part and said closing plate together forms a closing area which can be expanded.

17. The lid according to claim 16, wherein each one said first connecting part and said second connecting part comprises a locking portion for securing the lid to the oil pan.

18. The lid according to claim 15, wherein said first element comprises a first element handle portion arranged opposite to said first element connecting portion, and wherein said second element comprises a second element handle portion arranged opposite to said second element connecting portion, and wherein said lid is configured: such that a first relative movement between said first element handle portion and said second element handle portion results in that the closing arrangement is brought into its first state, and such that a second relative movement between said first element handle portion and said second element handle portion, said second relative movement being in opposite direction to said first relative movement, results in that the closing arrangement is brought into its second state.

19. The lid according to claim 18, wherein said first elongated element comprises a first element intermediate portion arranged between said first element handle portion and said first element connecting portion, and wherein said second elongated element comprises a second element intermediate portion arranged between said second element handle portion and said second element connecting portion, and wherein said pivotable joint is arranged in said first element intermediate portion and said second element intermediate portion.

20. The lid according to claim 19, wherein said first elongated element and said second elongated element are arranged in an X-shape, e.g. a scissor-like shape.

21. The engine oil system according to claim 1, wherein said oil pan comprises a counter locking arrangement arranged on the inside of said oil pan circumferentially around said opening, said counter locking arrangement being configured for mating with a locking portion of said expandable closing arrangement.

22. The engine oil system according to claim 1, wherein said oil pan comprises a counter holding arrangement arranged inside of said oil pan, and being configured for receiving and holding at least a portion of said expandable closing arrangement in order to act as a counter holding structure for said lid.

23. A vehicle comprising an engine oil system according to claim 1.

* * * * *